United States Patent Office 3,183,762
Patented May 18, 1965

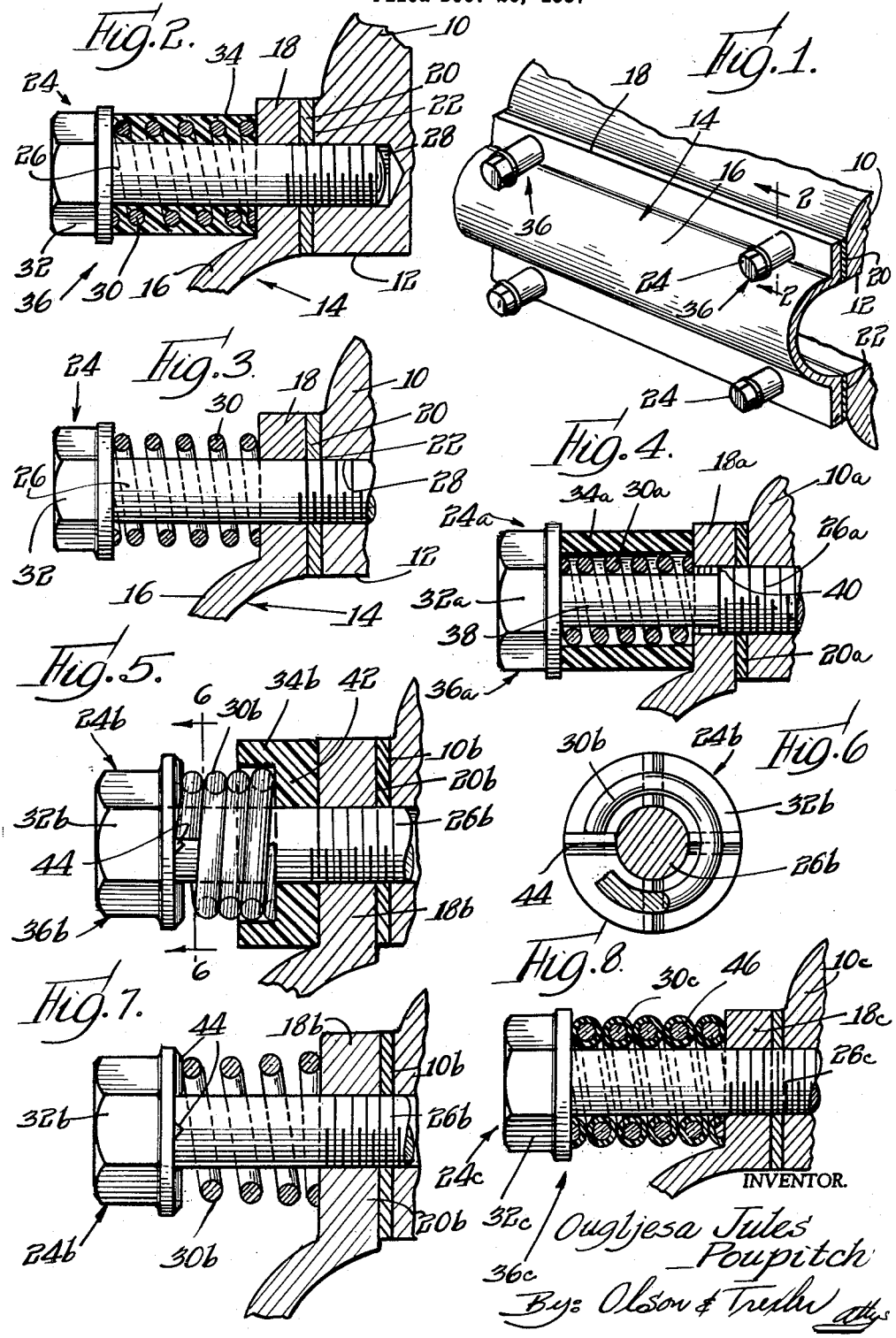

3,183,762
FASTENING DEVICE
Ougljesa Jules Poupitch, Itasca, Ill., assignor to Illinois Tool Works Inc., a corporation of Delaware
Filed Dec. 26, 1957, Ser. No. 705,270
4 Claims. (Cl. 85—62)

This invention is concerned with a fastener device—particularly one comprising a bolt and spring assembly.

In many instances, it is desired to hold workparts together resiliently. When the parts are subjected to some degree of relative movement, as through physical vibration, or when one or more parts are subject to thermal expansion and contraction, it is desirable that a certain amount of play be allowed in the fastening means. The amount of play, in many instances, must be carefully cotrolled, such as in installations having sealing gaskets. Sealing pressure on the gaskets must be carefully correlated with the material of a gasket and with pressures to be withstood.

It is contemplated that parts as heretofore referred to might be held together by bolts having helical springs compressed beneath their heads to a predetermined degree of compression. Handling of separate bolts and springs is inconvenient. The use of torque wrenches or other measuring devices to attain the proper degree of spring pressure is undesirable as a certain amount of skill is necessary on the part of the operator, and as the use of such wrenches or devices is inconvenient in many locations and is always somewhat time consuming.

Accordingly, it is an object of this invention to provide a preassembled bolt and helical spring for assembling workparts.

It is a particular object of this invention to provide such a preassembled bolt and spring in combination with a heat destructible or dissipable material determining the limit seating position of the bolt whereby subsequent destruction or dissipation of the material leaves the spring trapped beneath the bolthead and engaging a workpart with a predetermined pressure.

It is a further object of this invention to provide a method of assembling workparts under spring pressure wherein a plastic or other heat destructible or dissipable material is used in initial assembly and subsequently is burned away or dissipated to leave a pressure spring under a predetermined degree of compression.

Other and further objects and advantages of the present invention will be apparent from the following description when taken in connection with the accompanying drawings wherein:

FIG. 1 is a perspective view showing an assembly held together with fasteners in accordance with the principles of this invention;

FIG. 2 is a longitudinal sectional view through one of the fasteners and part of the accompanying assembly, as taken substantially along the line 2—2 of FIG. 1, showing one form of the invention;

FIG. 3 is a view similar to FIG. 2 showing the parts after the plastic or the like has been burned away or dissipated;

FIG. 4 is a view similar to FIG. 2 showing another embodiment of the invention;

FIG. 5 is another view similar to FIG. 2 showing a further embodiment of the invention;

FIG. 6 is a cross sectional view taken along the line 6—6 in FIG. 5;

FIG. 7 is a view similar to FIG. 3 and corresponding to FIG. 5;

FIG. 8 is another view similar to FIG. 2 showing yet another embodiment of the invention.

Referring now in greater particularity to the drawings and first to FIGS. 1-3, there will be seen a base or structure 10 from which a hot fluid may emanate. For example, the member 10 might be a part of a furnace or other heat device from which hot exhaust gases emanate. The structure 10 is open along one side, as at 12, or may have a plurality of openings therein and a collector or header or duct 14 is mounted on the member 10 over the opening or openings 12. The duct or the like 14 is shown as comprising a more or less semicylindrical body 16 having laterally outwardly projecting flanges 18 on the opposite longitudinal edges thereof. Gaskets 20 of any suitable material are positioned between the flanges 18 and corresponding flat surfaces 22 on the base or member 10 to seal the duct 14 thereto.

Bolts 24 having threaded shanks 26 project through the flanges 18 and the gaskets 20, and are threaded into tapped apertures 28 in the base or member 10. Helical springs 30 are trapped beneath the heads 32 of the bolts under predetermined compression to hold the duct 14 on the base 10 with a predetermined pressure.

As shown in FIGS. 1 and 2, the spring 30 initially is molded in a plastic cylinder 34. The spring 30 is held under predetermined compression in a mold, and the plastic cylinder 34 is cast or molded about the spring in accordance with well known techniques. Upon hardening or curing of the plastic and removal of the cylinder 34 from the mold, the plastic cylinder holds the spring under predetermined compression. The internal diameter of the plastic cylinder 34 is such as to form a press fit with the threads of the shank 26 whereby the bolt and the plastic cylinder having the spring molded therein comprise a preassembled fastener unit 36.

When a bolt is threaded into one of the apertures 28, the associated plastic cylinder 34 determines the limit seating position of the bolt. The plastic cylinder is of such a material as to be destroyed or dissipated by heat, for example, on the order of 200° to 250° F. Preferred plastic materials include styrene or polyethylene with a suitable additive. When hot fluid such as exhaust gases or products of combustion pass through the duct 14 as indicated by the arrows in FIG. 1, the plastic cylinder 34 is heated to a sufficiently high temperature that it is destroyed or dissipated or drips from the spring and bolt. The spring thus is free of the restricting force of the plastic cylinder, and exerts a pressure corresponding to the predetermined degree of compression on the flange 18 and the bolthead 32.

A further embodiment of the invention is shown in FIG. 4. In this embodiment, corresponding parts are identified by similar numerals with the addition of the suffix $a$. The bolt 24$a$ has a threaded shank 26$a$ which is provided with a reduced diameter threadless section 38 beneath the bolthead 32$a$. This provides an internal shoulder 40, and the spring 30$a$ initially is trapped about the reduced diameter shank section 38 above the shoulder 40. As will be understood, the spring is capable of sufficient diametral stretching to allow it to be forced over the threaded shank 26$a$. The spring initially may have a relatively slight degree of compression, or it may be uncompressed.

A plastic sleeve, tube, or cylinder 34$a$ is press fitted over the spring 30$a$ and is of predetermined length. The cylinder 34$a$ may be molded to the desired length or may be cut from an extended length of tubing.

As in the previous embodiment of the invention, the plastic cylinder determines the limit seating position of the bolt. In this instance the spring is compressed to its predetermined degree by engagement with the flange 18$a$ as the bolt is threaded into place. Subsequent heat destruction or dissipation of the plastic cylinder leaves the spring under predetermined compression in accordance with the length of the cylinder.

A further embodiment of the invention is shown in FIG. 5. Most of the parts correspond to those previously described, and similar numerals are utilized for identification, this time with the addition of the suffix b. In this instance, the spring 30b initially is not compressed axially. A plastic washer or disc 42, having a cylindrical sleeve or flange 34b thereon, is press fitted over the shank 26b and holds the spring on the shank. The cylindrical sleeve or flange 34b properly centralizes the spring. As in the previous embodiments of the invention, the spring has a left-hand lead whereby to resist retraction of the bolt. Axially extending radial protuberances 44 are provided beneath the bolthead and integral therewith to form abutments for the end of the spring, more positively to resist retrograde movement of the bolt.

In accordance with the embodiment of the invention as shown in FIGS. 5 and 6, the bolt is threaded into the base 10b until the spring 30b is completely collapsed (see FIG. 5). The plastic washer or disc 42 thus coacts with the spring 30b to determine the limit seating position of the bolt. It will be appreciated that, in the previous embodiments of the invention, the spring and plastic cylinder in a sense coact to determine the limit seating position.

After subsequent heat destruction or dissipation of the washer 42, the spring 30b expands axially a distance equal to the thickness of the washer. The spring accordingly remains under a predetermined compression as determined by the thickness of the washer 42.

Yet another embodiment of the invention is shown in FIG. 8, similar parts being identified by similar numerals with the addition of the suffix c. In this instance, the spring 30c is coated with a plastic coating 46 of the same nature as the plastic material heretofore described. The plastic coating 46 of the spring 30c engages the threaded shank 26c of the bolt to form a press fit thereon whereby to hold the spring in preassembled relation with the bolt. The bolt is turned down into the member 10c until the coating on adjacent turns of the spring is in firm engagement. In other words, the bolt is turned down as far as it will go, the spring and plastic coacting to determine the limit seating position of the bolt. Subsequent heat destruction of the plastic material leaves the spring trapped beneath the bolthead under a predetermined degree of compression.

In accordance with all of the embodiments of the invention as herein shown and described, there is provided a preassembled fastening device comprising a bolt, a helical spring thereon, and a plastic substance. Only one part need be handled, and no torque wrenches or measuring devices are necessary since the spring and plastic material coact to determine the limit seating position of the bolt. Subsequent heat destruction or dissipation of the plastic material leaves the spring trapped beneath the bolthead under a predetermined degree of compression whereby resiliently to hold the workparts together. Although it has been suggested that the plastic material be destroyed or dissipated by heat or hot gases conducted by the workpieces, it will be understood that the plastic material could be destroyed or dissipated by other means such as in a heat treating process or in an enamel baking process, or simply by the external application of heat such as from a torch.

Various changes in structure will no doubt occur to those skilled in the art and will be understood as forming a part of this invention insofar as they fall within the spirit and scope of the appended claims.

The invention is claimed as follows:

1. A fastening device for securing a first member with respect to a second member comprising a threaded bolt adapted to extend through said first member and to be threaded into said second member, said bolt having radially extending abutment means thereon, a coil spring having a plurality of convolutions encircling said bolt and having a transverse dimension less than said abutment means and disposed beneath said abutment means and having a predetermined minimum axial length when fully axially collapsed and a normal length when unrestrained, and an unyielding rigid heat dissipable element having a melting point less than the remainder of the fastening device elements, said heat dissipable element being of cylindrical configuration and encircling said bolt and coiled spring, said heat dissipable element having a predetermined normal length and resistive of compressive deformation, said element having a length greater than said minimum length of the spring and less than the normal length of the spring, and said fastening device being adapted to be tightened for clamping said element between said abutment means and said first member, and the heat dissipable element being adapted to be dissipated by subsequent application of heat whereby to leave said spring in a semi-expanded condition between said abutment means and said first member to hold said first member against said second member with a predetermined pressure.

2. A fastening device of the type contemplated in claim 1 wherein said coil spring has a transverse dimension less than the threads on the bolt which are provided at the end of the bolt opposite to said abutment means, the unthreaded portion of the bolt intermediate the abutment means and threads provided at the other end of said bolt being encircled by said coil spring whereby said spring is retained on said bolt after said heat dissipable material has been dissipated by the subsequent application of heat.

3. A fastening device for securing a first member with respect to a second member comprising a threaded bolt adapted to extend through said first member and to be threaded into said second member, said bolt having radially extending abutment means thereon, a coil spring having a plurality of convolutions encircling said bolt and having a transverse dimension less than said abutment means and disposed beneath said abutment means and having a predetermined minimum axial length when fully axially collapsed and a normal length when unrestrained, and an unyielding rigid heat dissipable element having a melting point less than the remainder of the fastening device elements comprising a cylinder encircling said bolt and in which the coil spring is embedded, said heat dissipable element having a predetermined normal length and resistive of compressive deformation, said element having a length greater than said minimum length of the spring and less than the normal length of the spring, and said fastening device being adapted to be tightened for clamping said element between said abutment means and said first member and the heat dissipable element being adapted to be dissipated by subsequent application of heat whereby to leave said spring in a semi-expanded condition between said abutment means and said first member to hold said first member against said second member with a predetermined pressure.

4. A fastening device for securing a first member with respect to a second member comprising a threaded bolt adapted to extend through said first member and to be threaded into said second member, said bolt having radially extending abutment means thereon, a coil spring having a plurality of convolutions encircling said bolt and having a transverse dimension less than said abutment means and disposed beneath said abutment means and having a predetermined minimum axial length when fully axially collapsed and an unyielding rigid heat dissipable element of a material having a melting point less than the remainder of the fastening device elements and comprising a coating of said material on the coils of said spring, said coating of heat dissipable material holding the turns of the spring in predetermined spaced relation, the individual convolutions of said coil spring being encapsulated in said heat dissipable element, said element in combination with said spring causing the spring to have a length greater than said minimum length of the spring, and said fastening device being adapted to be tightened for clamping said element between said abutment means and said first member and the heat dissipable element being adapted to be dissipated by subsequent application of heat whereby to leave said spring in a semi-expanded condition between said abutment means and said first member to hold said first member against said second member with a predetermined pressure.

References Cited by the Examiner

UNITED STATES PATENTS

| | | | |
|---|---|---|---|
| 41,950 | 3/64 | Vose | 29—173 |
| 501,052 | 7/93 | Brown | 151—38 |
| 1,151,764 | 8/15 | Dodson | 116—114.5 |
| 1,591,301 | 7/26 | Ford | 29—227 |
| 1,733,457 | 10/29 | Hannahs | 285—268 |
| 1,737,543 | 11/29 | Mason | 151—38 |
| 1,953,575 | 4/34 | Oberstadt | 29—423 |
| 2,230,069 | 1/41 | Rushmore | 267—33 |
| 2,254,288 | 9/41 | Holleran | 151—38 |
| 2,330,102 | 9/43 | Yarnall | 151—38 |
| 2,821,971 | 2/58 | Benz et al. | |

FOREIGN PATENTS

| | | |
|---|---|---|
| 371,782 | 3/23 | Germany. |
| 610,869 | 10/48 | Great Britain. |

EWARD C. ALLEN, *Primary Examiner.*

ARTHUR B. MILLER, CARL W. TOMLIN,
*Examiners.*